United States Patent
Lee et al.

(10) Patent No.: US 8,925,582 B2
(45) Date of Patent: Jan. 6, 2015

(54) OIL CONTROL VALVE FOR THE VARIABLE VALVE LIFT SYSTEM

(75) Inventors: Chang-Hoon Lee, Busan (KR); Eui-Dong Roh, Busan (KR); Ji-Hoon Park, Busan (KR); Ki-Ryong Lee, Gyeonggi-do (KR)

(73) Assignee: Unick Corporation, Busan (KR)

( * ) Notice: Subject to any disclaimer, the term of this patent is extended or adjusted under 35 U.S.C. 154(b) by 124 days.

(21) Appl. No.: 13/516,598

(22) PCT Filed: Dec. 8, 2010

(86) PCT No.: PCT/KR2010/008745
§ 371 (c)(1),
(2), (4) Date: Aug. 22, 2012

(87) PCT Pub. No.: WO2011/074823
PCT Pub. Date: Jun. 23, 2011

(65) Prior Publication Data
US 2013/0048106 A1 Feb. 28, 2013

(30) Foreign Application Priority Data
Dec. 15, 2009 (KR) ........................ 10-2009-0124745

(51) Int. Cl.
| F16K 31/06 | (2006.01) |
|---|---|
| F15B 13/04 | (2006.01) |
| F16K 31/02 | (2006.01) |
| F01L 13/00 | (2006.01) |
| F01L 1/344 | (2006.01) |

(52) U.S. Cl.
CPC ............. *F01L 13/00* (2013.01); *F16K 31/0665* (2013.01); *F01L 2001/3443* (2013.01)
USPC ............... 137/596.17; 137/596.2; 251/129.14

(58) Field of Classification Search
USPC .................. 137/614.2, 596.17, 596.1, 596.2; 251/129.14, 129.15
See application file for complete search history.

(56) References Cited

U.S. PATENT DOCUMENTS

| 3,738,387 A | 6/1973 | Ingram et al. |
|---|---|---|
| 4,998,559 A | 3/1991 | McAuliffe, Jr. |
| 5,076,323 A | 12/1991 | Schudt |
| 5,226,702 A | 7/1993 | Brown et al. |

(Continued)

FOREIGN PATENT DOCUMENTS

| DE | 3503785 A1 | 8/1986 |
|---|---|---|
| DE | 3938136 A1 | 12/1991 |

(Continued)

OTHER PUBLICATIONS

International Search Report mailed Aug. 10, 2011 for PCT/KR2010/008745.
Written Opinion of the International Searching Authority mailed Aug. 10, 2011 for PCT/KR2010/008745.

\* cited by examiner

*Primary Examiner* — Elizabeth Houston
*Assistant Examiner* — Michael R Reid
(74) *Attorney, Agent, or Firm* — Lowe Hauptman & Ham, LLP (57) ABSTRACT

The present invention relates to an oil control valve for a variable valve lift system that obtains in a stable manner a constant hydraulic pressure in the hydraulic line connecting the oil control valve and the vale lift control actuator, and thereby reliably controls valve lift according to the number of revolutions and load of the engine.

9 Claims, 8 Drawing Sheets

(56) References Cited

U.S. PATENT DOCUMENTS

| | | |
|---|---|---|
| 5,344,118 A | 9/1994 | Kamiya et al. |
| 6,209,563 B1 * | 4/2001 | Seid et al. ................... 137/15.21 |
| 7,367,357 B2 * | 5/2008 | Kim ........................ 137/625.65 |
| 2002/0145125 A1 | 10/2002 | Tomoda et al. |
| 2003/0089872 A1 * | 5/2003 | Furuta et al. .............. 251/129.14 |
| 2004/0045611 A1 * | 3/2004 | Avila ....................... 137/596.17 |
| 2005/0034769 A1 * | 2/2005 | Moreno et al. ........... 137/596.17 |
| 2005/0067028 A1 * | 3/2005 | Ryuen et al. ............. 137/596.17 |
| 2005/0150553 A1 | 7/2005 | Flynn et al. |
| 2006/0278838 A1 * | 12/2006 | Chavanne ................ 251/129.15 |

FOREIGN PATENT DOCUMENTS

| | | |
|---|---|---|
| DE | 10239823 | 4/2003 |
| FR | 2079123 A5 | 6/1973 |
| JP | 08105563 A | 4/1996 |
| JP | 2004293595 A | 10/2004 |
| JP | 2006242384 A | 9/2006 |
| JP | 2007-085548 | 4/2007 |
| KR | 10-0121814 | 12/1997 |
| WO | 2008147954 A1 | 12/2008 |
| WO | 2010010456 A1 | 1/2010 |

OIL CONTROL VALVE FOR THE VARIABLE VALVE LIFT SYSTEM

CROSS REFERENCE TO RELATED APPLICATION

This application claims the priority of Korean Patent Application No. 10-2009-0124745, filed on Dec. 15, 2009 in the KIPO (Korean Intellectual Property Office). Further, this application is the National Phase application of International Application No. PCT/KR2010/008745 filed Dec. 8, 2010, which designates the United States and was published in English.

TECHNICAL FIELD

The present invention relates to an oil control valve, more particularly to an oil control valve for the variable valve lift system which controls valve deflection according to driving conditions.

BACKGROUND ART

As automobile technology develops, various technologies for enhancing fuel economy and improving power output have appeared on the scene. For example, there are: the variable induction system (VIS), which controls the length and cross section of the induction passage according to the number of revolutions and load of the engine; the variable valve timing (VVT) system, which controls valve timing according to the number of revolutions and load of the engine; the variable valve lift (VVL) system, which controls valve deflection according to the number of revolutions and load of the engine; etc.

In general, when an engine rotates at a high speed, a large intake of air is desirable. However, when it rotates at a low speed or a constant speed, a large intake of air reduces the flow speed, causing the vortex in the combustion chamber not to occur smoothly, thus reducing the inhalation efficiency.

The variable valve lift system, which was developed in order to solve the afore-mentioned problem, increases inhalation by driving the valve at high lift when the engine turns at a high speed, and decreases inhalation by driving the valve at low lift when the engine turns at a low or constant speed while increasing flow speed, thus realizing high fuel economy, high power output, and high efficiency.

Here, valve lift is an important factor in determining the amount of air inhalation and the amount of exhaust gas emission, and represents the separation distance between the valve face and the valve seat. In other words, the greater the valve lift (high lift), the greater the amount of air flow into the cylinder and the greater the amount of exhaust gas emission, thus raising the intake-outtake efficiency.

The variable valve lift system generally uses hydraulic pressure in order to control valve lift. Such a hydraulic type variable valve lift system includes an oil pump, an oil control valve (OCV), an oil filter, and a valve lift control actuator.

However, with the aforementioned hydraulic type variable valve lift system, if a constant hydraulic pressure is not obtained in the hydraulic line connecting the oil control valve and the valve lift control actuator, the control of valve lift may become impossible, or unreliable even if control is possible.

DISCLOSURE OF INVENTION

Technical Problem

To resolve the problem above, an aspect of the present invention provides an oil control valve for the variable valve lift system that can obtain a constant hydraulic pressure in a stable manner in the hydraulic line connecting the oil control valve and the valve lift control actuator, and by so doing, can reliably control valve lift according to the number of revolutions and load of the engine.

Solution to Problem

To fulfill the aforementioned purpose, an aspect of the present invention provides an oil control valve for a variable valve lift system that includes:

a valve housing having a cylindrical shape, with a control port formed in a middle portion and a drain port formed in a lower portion;

a valve cap joined to an upper portion of the valve housing and having an inflow port formed in an upper surface;

an upper seat installed inside the valve housing, with the upper seat located above the control port and having a first through-hole formed in its center;

a lower seat installed inside the valve housing, with the lower seat located below the control port and having a second through-hole formed in its center;

a ball valve installed to be able to move up and down in a first chamber formed by the valve cap and the upper seat, with the ball valve configured to open and close the first through-hole;

a check valve, which is installed to be able to move up and down below the lower seat, and which has an upper portion protruding convexly so as to open and close the second through-hole and has a third through-hole formed in a center of its upper surface;

a pilot installed to be able to move up and down inside the valve housing, where the pilot is formed in multi-sections such that an upper portion of the pilot has a smaller diameter than that of a lower portion of the pilot, with the upper portion of the pilot having the smaller diameter configured to contact the ball valve through the first to third through-holes;

a pressing spring, which is installed on an upper portion of the pilot and configured to elastically push the check valve such that an upper portion of the check valve seals the second through-hole;

a valve case in which a lower portion of the valve housing is inserted;

a plunger installed inside the valve case and placed in close contact with a lower portion of the pilot;

a bobbin, which encircles the plunger, and around a perimeter of which a coil is wound; and a yoke located between the plunger and the bobbin.

Advantageous Effects of Invention

The oil control valve for the variable valve lift system according to an embodiment of the present invention constructed as described above allows residual pressure to be maintained in the second chamber formed by the upper seat and the lower seat, by having the pressing spring elastically push the check valve upward so as to seal the second through-hole. Consequently, a constant hydraulic pressure is obtained in a stable manner in the hydraulic line connecting the oil control valve and the valve lift control actuator, and by means of this, the valve lift can be reliably controlled according to the number of revolutions and load of the engine.

MODE FOR THE INVENTION

The oil control valve according to certain embodiments of the invention will be described below in more detail with reference to the accompanying drawings. Those components that are the same or are in correspondence are rendered the same reference numeral regardless of the figure number.

Figure 1:
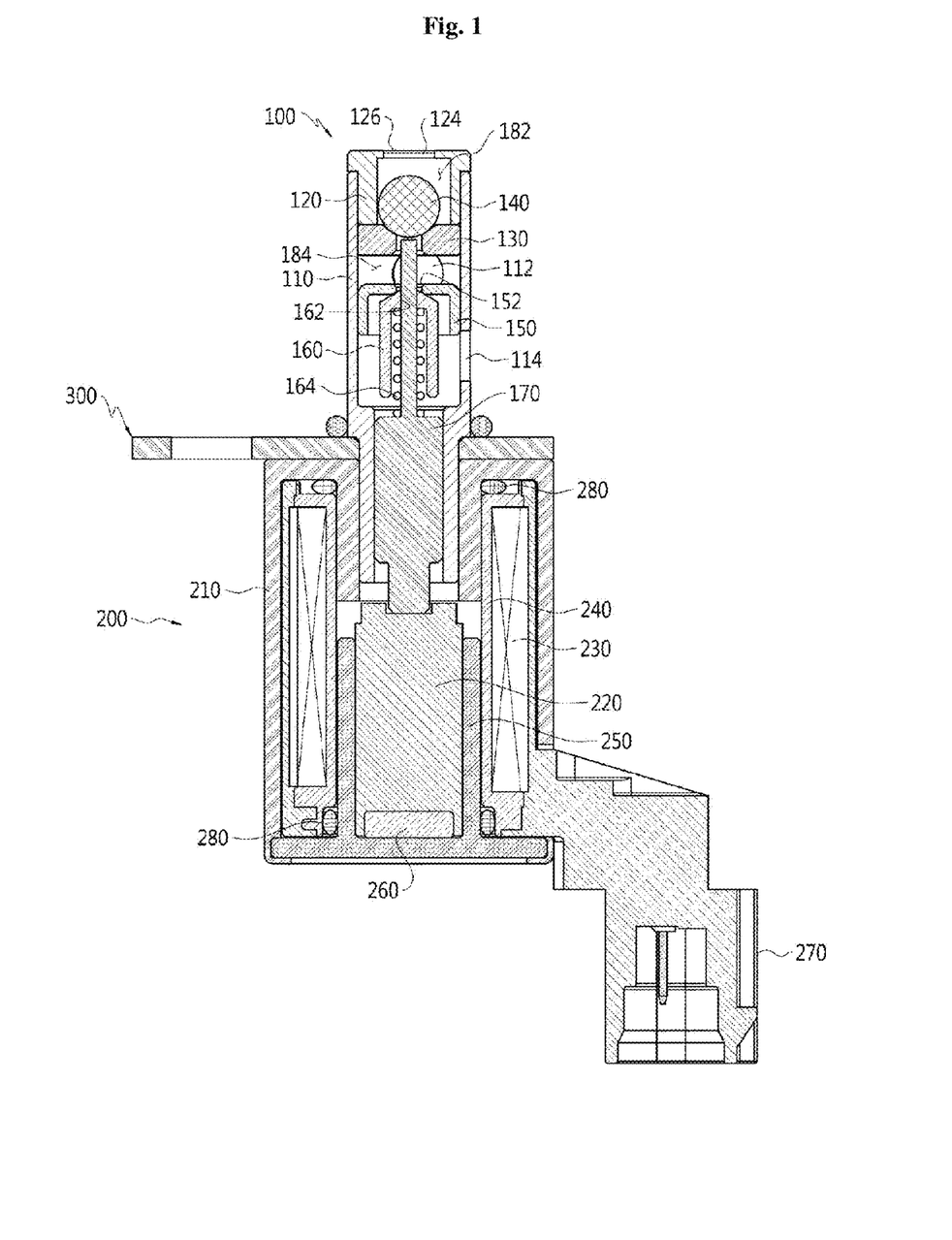
FIG. 1 illustrates an oil control valve for a variable valve lift system according to a first embodiment of the present invention.

FIG. 1 illustrates an oil control valve for a variable valve lift system according to a first embodiment of the present invention.

With reference to FIG. 1, the oil control valve (OCV) for the variable valve lift system (henceforth, the oil control valve) according to the first embodiment of the present invention consists of a hydraulic part 100 and an electronic part 200.

First, the hydraulic part 100 comprises a valve housing 110, and a valve cap 120 joined to an upper portion of the valve housing 110. The valve housing 110 is formed as a vertically extended cylinder and is formed in multi-sections, so that its lower portion may be inserted into the valve case 210 of the electronic part 200 described below. Also, the valve cap 120 is formed as a cylinder with its upper surface sealed and has a flange to prevent it from being inserted past a certain depth into the upper portion of the valve housing 110.

The valve housing 110 thus shaped has a control port 112 in the middle, and below the control port 112 is a drain port 114. Also, an inflow port 124 is formed in the center of the top of the valve cap 120, and a mesh type filter 126 is installed on the inflow port 124. Of the aforementioned ports 112, 114, and 124, the inflow port 124 is connected to an oil pump (not pictured), the control port 112 is connected to a valve lift control actuator (not pictured) of the variable valve lift system, and the drain port 114 is connected to an oil tank (not pictured).

The inside of the valve housing 110 is fitted with an upper seat 130, a ball valve 140, a lower seat 150, a check valve 160, and a pilot 170.

The upper seat 130 is formed as a circular plate, and has a first through-hole 132 formed in its center. This upper seat 130 is located above the control port 112, and as illustrated in FIG. 1, the bottom of the valve cap 120 is placed in close contact with the an upper surface of the upper seat 130.

Here, inside the first chamber 182, which is formed by the valve cap 120 and the upper seat 130, the ball valve 140 is installed in such a way that allows it to move up and down. This ball valve 140 is an element by which the first through-hole 132 is opened and closed, and is moved down by the oil that is supplied during normal use through the inflow port 124, to seal the first through-hole 132.

The lower seat 150 is shaped like an overturned cup, and has a second through-hole 152 formed in the center of its upper surface. This lower seat 150 is located below the control port 112, and below the lower seat 150 is the check valve 160, which opens and closes the second through-hole 152.

The check valve 160 is formed as a cylinder with its upper portion sealed, where the sealed upper portion protrudes convexly so as to be able to open and close the second through-hole 152. A third through-hole 162 is formed in the center of its upper surface. This check valve 160 is installed to be moveable in relation to the lower seat 150, so as to open and close the second through-hole 152; however, it is pushed upward during normal use by the pressing spring 164 installed inside it to seal the second through-hole 152.

As the check valve 160 is elastically pushed upward by the pressing spring 164 to block the second through-hole 152, the second chamber 184 formed by the upper seat 130 and the lower seat 150 is sealed.

The pilot 170 is an element that separates the ball valve 140 from the upper seat 130 by rising when the electronic part 200 is operated. This pilot 170 is extended along the valve housing 110, and is formed in multi-sections, with the diameter of the upper portion smaller than that of the lower portion. The upper portion with the smaller diameter goes through the first to the third through-holes 132, 152, and 162 and comes into contact with the ball valve 140.

The electronic part 200 includes a valve case 210, into which the lower portion of the valve housing 110 is inserted. Inside this valve case 210 is installed a plunger 220, which is placed in close contact with a lower portion of the pilot 170, and around the plunger 220 is joined the bobbin 240, which is wound with coil 230 on its perimeter. Also, a yoke 250, located between the plunger 220 and the bobbin 240, is joined so as to seal the open lower portion of the valve case 210, and a spacer 260 is installed between a lower surface of the plunger 220 and the yoke 250. Also, on one side of the valve case 210 is provided a connector 270, which is electrically connected to the bobbin 240 to supply power, and an O-ring 280 is installed between the valve case 210 and the bobbin 240, and also between the bobbin 240 and the yoke 250.

A bracket 300 is joined between the aforementioned hydraulic part 100 and the electronic part 200, and more specifically, between the valve housing 110 and the valve case 210. An O-ring is installed on an upper surface of the bracket 300 to encircle the valve housing 110.

In the oil control valve according to the first embodiment of the present invention described above, the upper seat 130, the ball valve 140, the lower seat 150, the check valve 160, and the pilot 170 can be made of non-ferrous material that is lighter than iron.

If the upper seat 130, the ball valve 140, the lower seat 150, the check valve 160 and the pilot 170 are thus made of non-ferrous material, the inertia due to vibrations from the vehicle and shocks that occur during travel can be minimized. In other words, the supply and cutting-off of oil is reliable, and valve lift (not pictured) using the oil control valve is reliable.

Figure 2:
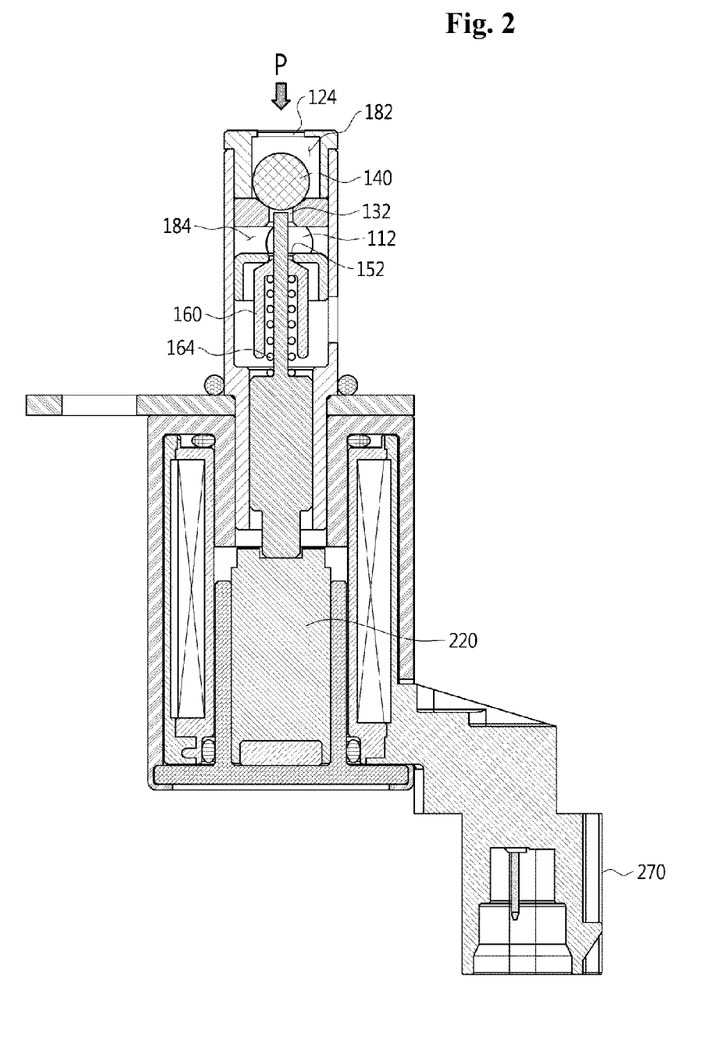
FIG. 2, FIG. 3, and FIG. 4 illustrate the activation process of an oil control valve for a variable valve lift system according to the first embodiment of the present invention.
Figure 3:
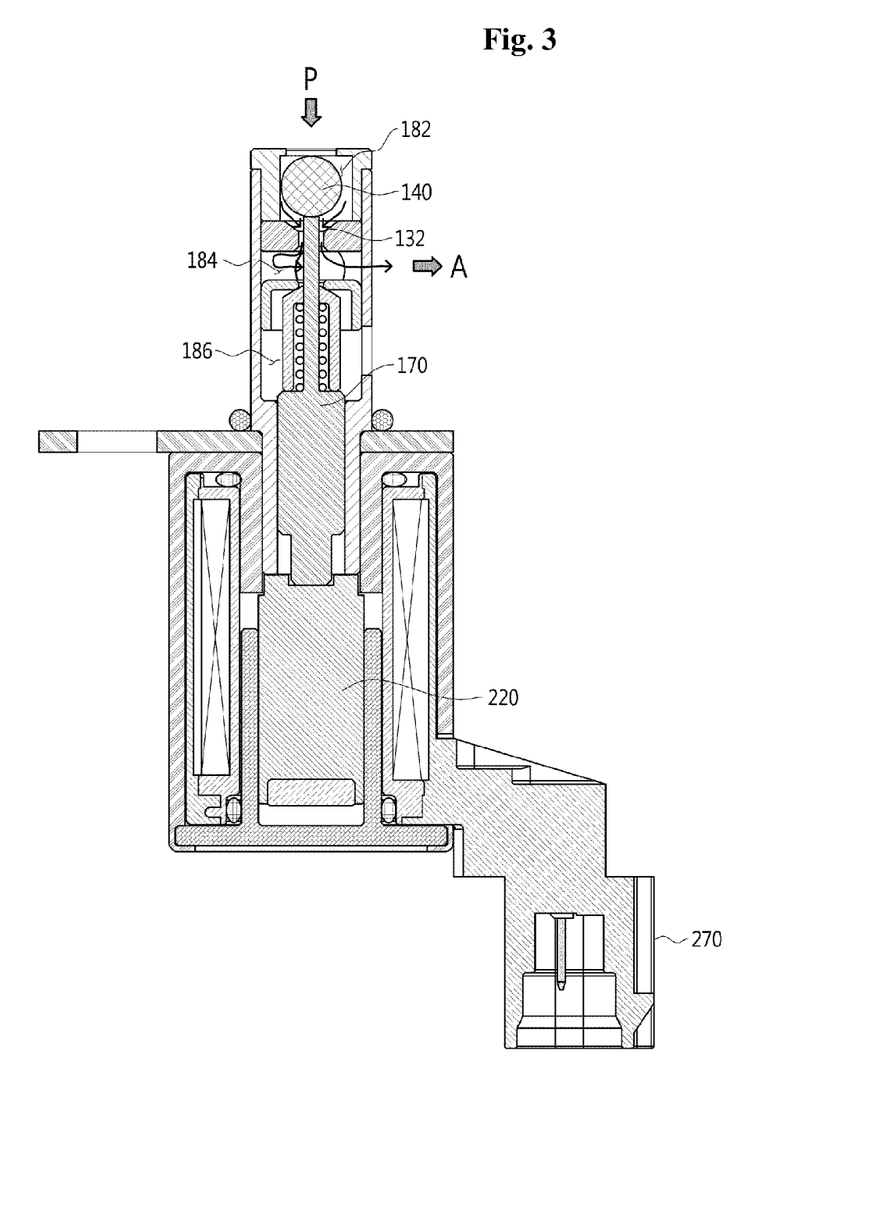
Figure 4:
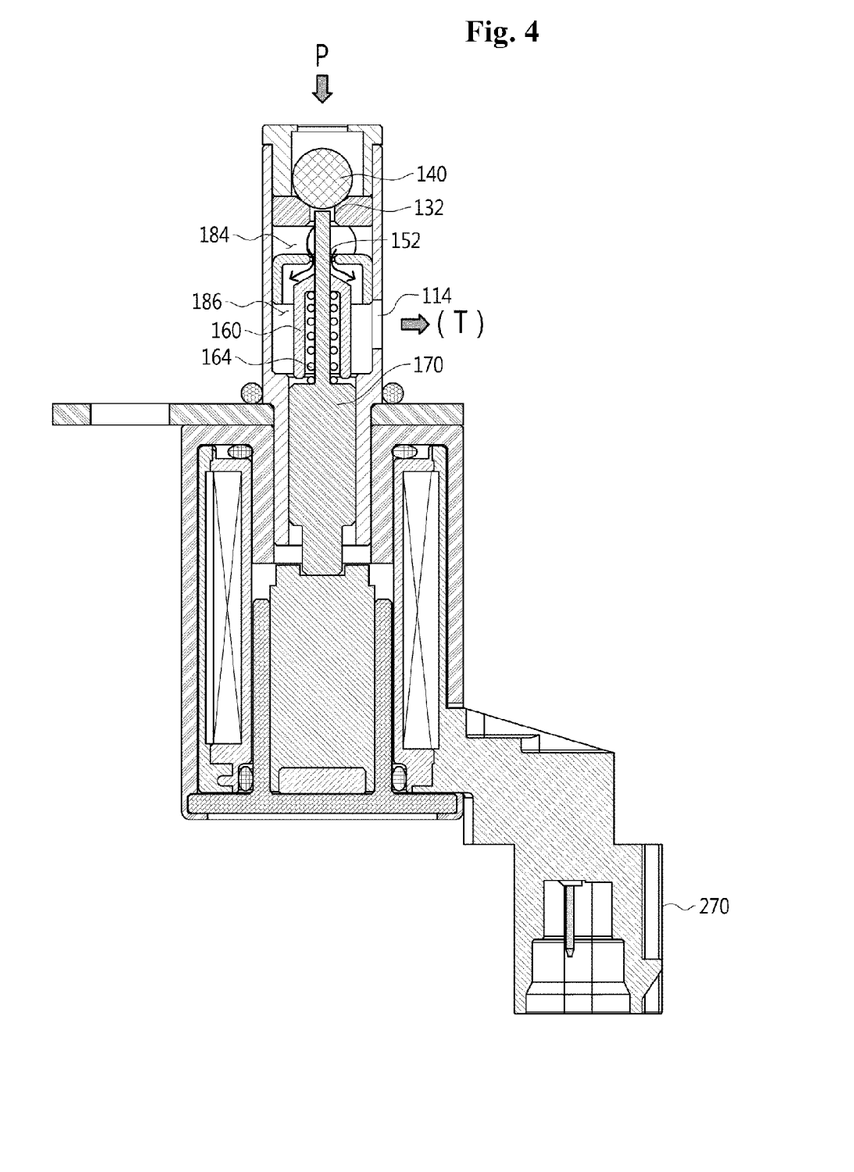

FIG. 2 to FIG. 4 illustrate the operation process of an oil control valve for a variable valve lift system according to the first embodiment of the present invention.

The oil control valve according to the first embodiment of the present invention is of the NC (normal close) type.

As illustrated in FIG. 2, since the plunger 220 is not magnetized during normal use, if oil is supplied to the first chamber 182 through the inflow port 124, the ball valve 140 descends and seals the first through-hole 132. Also, the pressing spring 164 elastically pushes the check valve 160 upward, sealing the second through-hole 152. In other words, the first through-hole 132 and the second through-hole 152 are blocked by the ball valve 140 and the check valve 160, and thus the second chamber 184 is sealed. Consequently, the oil accumulated in the first chamber 182 is not let into the second chamber 184, and the oil is not let out through the control port 112, and therefore, the valve lift control actuator (not pictured) is not activated.

In the situation described above, if power is supplied through the connector 270, the plunger 220 is magnetized and ascends, and accordingly the pilot 170 also ascends along with it, raising the ball valve 140 (refer to FIG. 3). If the ball valve 140 ascends and the first through-hole 132 is opened, the oil accumulated in the first chamber 182 is let into the second chamber 184, and is carried through the control port 112 to the valve lift control actuator A, activating the valve lift control actuator A.

Here, since the check valve 160 is being pushed upward by the pressing spring 164, oil is not allowed to flow through the second through-hole 152 into the third chamber 186 (the space formed by the lower seat and the pilot).

As illustrated in FIG. 4, if the power that was supplied through the connector 270 is cut off, the plunger 220 and the pilot that had ascended now descend, and the ball valve 140 also descends, closing up the first through-hole 132.

Here, in the process by which the ball valve 140 seals the first through-hole 132, the internal pressure momentarily increases, and if this pressure is greater than the pressure of the pressing spring 164 elastically pushing the check valve 160 upward, then the second through-hole 152 is opened up. In other words, the pressing spring 164 is compressed by the internal pressure of the second chamber 184, and this causes the check valve 160 to descend, opening up the second through-hole 152. If the second through-hole 152 is opened up, the oil accumulated in the second chamber 184 is carried to the third chamber 186, and is emitted through the drain port 114 to the oil tank T.

As the oil is emitted through the drain port 114 to the oil tank and the internal pressure of the second chamber 184 is decreased, the check valve 160 is raised by the pressing spring 164, thereby sealing the second through-hole 152.

The oil control valve according to the first embodiment of the present invention as described above can maintain the internal pressure of the second chamber 184 at a certain level through the ball valve 140 and the check valve 160. Consequently, the hydraulic pressure can be obtained in a stable manner in the hydraulic line connecting the oil control valve and the valve lift control actuator (not pictured), and by means of this, valve lift (not pictured) can be controlled reliably according to the number of revolutions and load of the engine.

Figure 5:
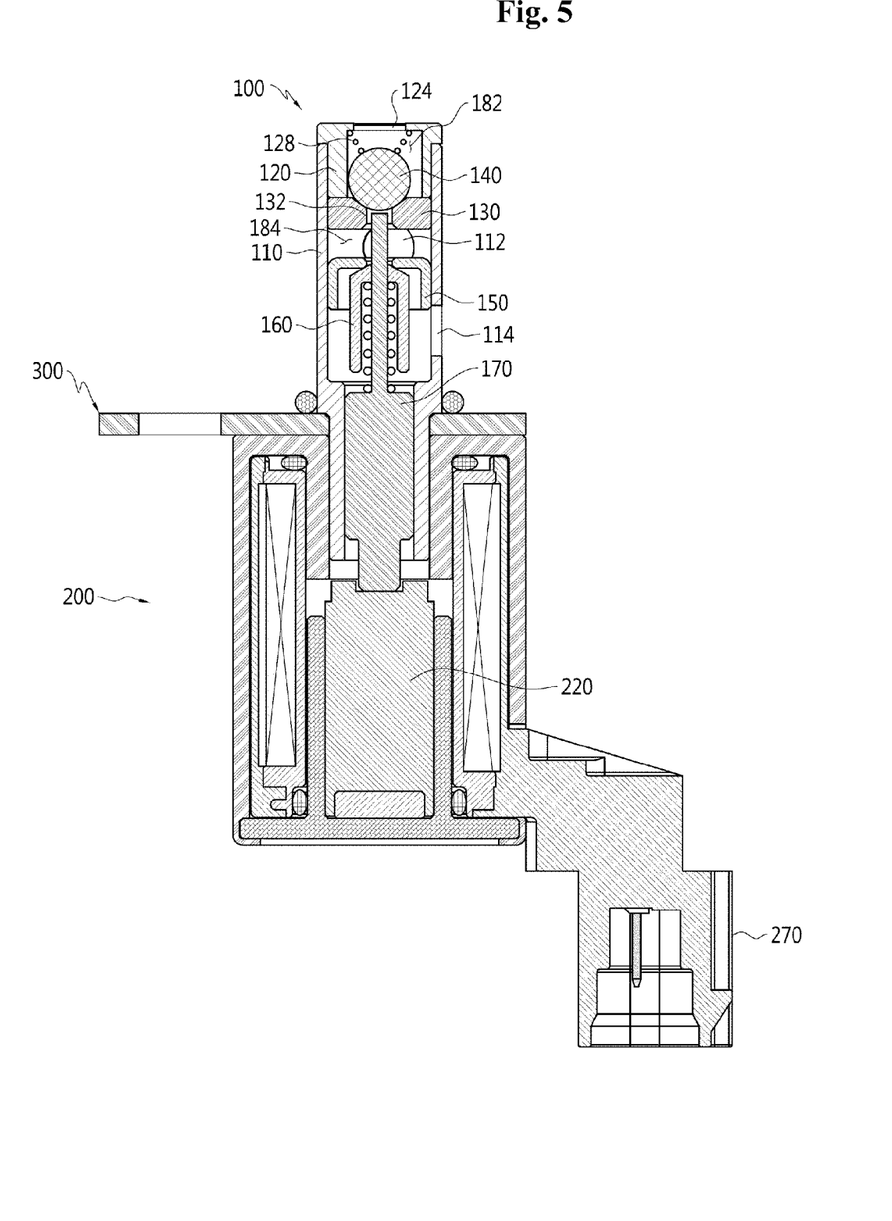
FIG. 5 illustrates an oil control valve according to a second embodiment of the present invention.

FIG. 5 illustrates an oil control valve according to a second embodiment of the present invention.

The oil control valve according to the second embodiment of the present invention includes a hydraulic part 100, an electronic part 200, and a bracket 300, with the electronic part 200 and the bracket 300 having the same structure as in the first embodiment. Below, as regards those components that are identical in different embodiments of the present invention, a detailed explanation will be foregone.

With reference to FIG. 5, the hydraulic part 100 of the oil control valve comprise: a valve housing 110 having a control port 112 and a drain port 114; a valve cap 120 having an inflow port 124 and joined to an upper portion of the valve housing 110; and parts installed inside the valve housing 110, namely: an upper seat 130; a ball valve 140; a lower seat 150; a check valve 160; and a pilot 170.

Here, a first chamber 182 formed by the valve cap 120 and the upper seat 130 is installed so as to allow the ball valve 140 to move vertically, and a return spring 128 is installed on an upper portion of the ball valve 140. This return spring 128 pushes the ball valve 140 downward so as to seal the first through-hole 132.

The oil control valve according to the second embodiment of the present invention further comprises the return spring 128 as described above. This return spring 128 puts the ball valve 140 in close contact with the first through-hole 132, and prevents the ball valve 140 from ascending randomly due to vibrations from the vehicle and shocks that occur during travel. In other words, by preventing the first through-hole 132 from randomly opening due to vibrations and shocks, it prevents the oil accumulated in the second chamber 184 from flowing back into the first chamber 182, and as the opening and closing of the first through-hole 132 is reliable, valve lift (not pictured) using the oil control valve is reliable.

Figure 6:
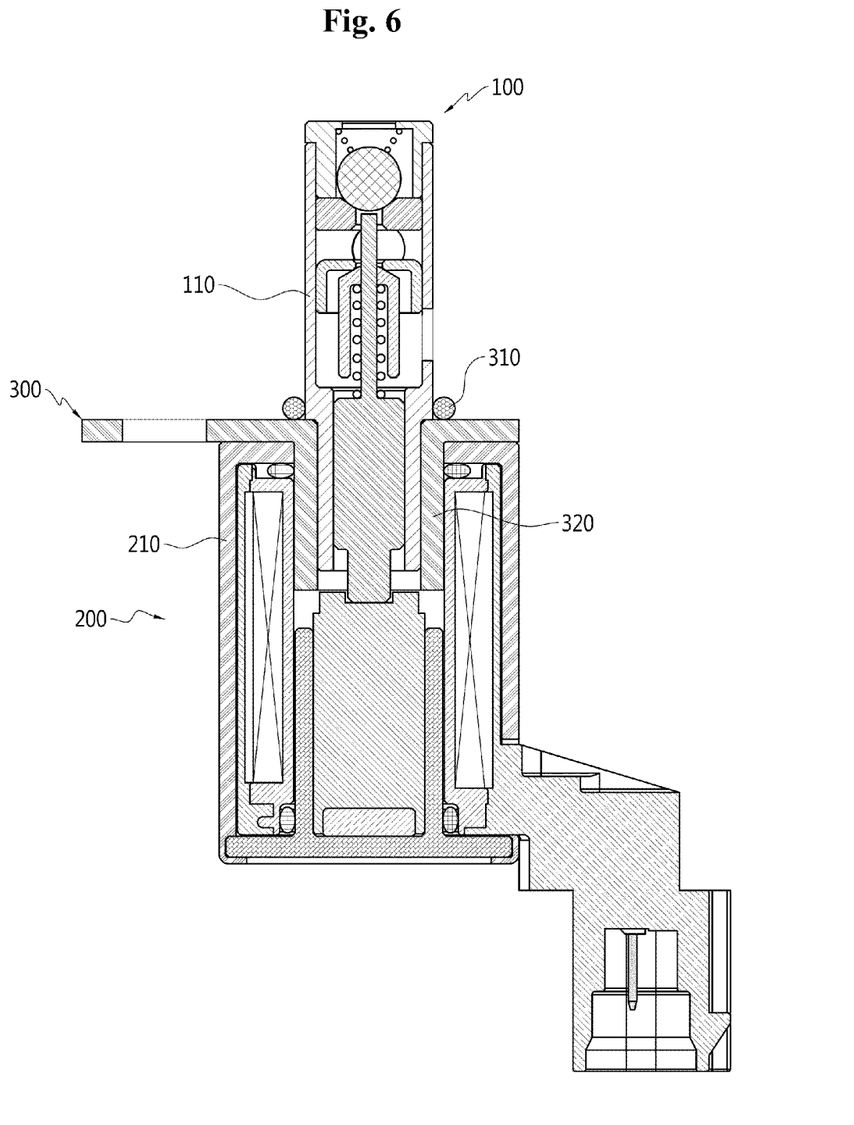
FIG. 6 illustrates an oil control valve according to a third embodiment of the present invention.

FIG. 6 illustrates an oil control valve according to a third embodiment of the present invention.

The oil control valve according to the third embodiment of the present invention includes a hydraulic part 100, an electronic part 200, and a bracket 300. Of these, the hydraulic part 100 and the electronic part 200 have the same structure as in the second embodiment.

As illustrated in FIG. 6, the bracket 300 for holding the oil control valve in place is joined between the valve housing 110 and the valve case 210, and on an upper surface of the bracket 300, an O-ring is installed encircling the valve housing 110. Also, formed in a lower portion at the center of the bracket 300 is a protrusion 320, which is inserted between the exterior of the lower part of the valve housing 110 and the interior of the upper part of the valve case 210 when the hydraulic part 100 and the electronic part 200 are joined.

Here, the valve case 210 and the bracket 300 are processed by press work. Consequently, production is easy, and the effect of burrs occurring during treatment can be minimized. For example, assemblage defects or sealing defects due to burrs can be minimized.

When inserting the valve housing 110 into the protrusion 320 of the bracket 300, or when inserting the protrusion 320 of the bracket 300 into the valve case 210, it may be preferable to employ force-fitting using a press. Furthermore, the effects of assemblage and sealing can be enhanced by brazing or laser-welding the areas of contact after the valve housing 110, the valve case 210, and the bracket 300 are assembled.

Figure 7:
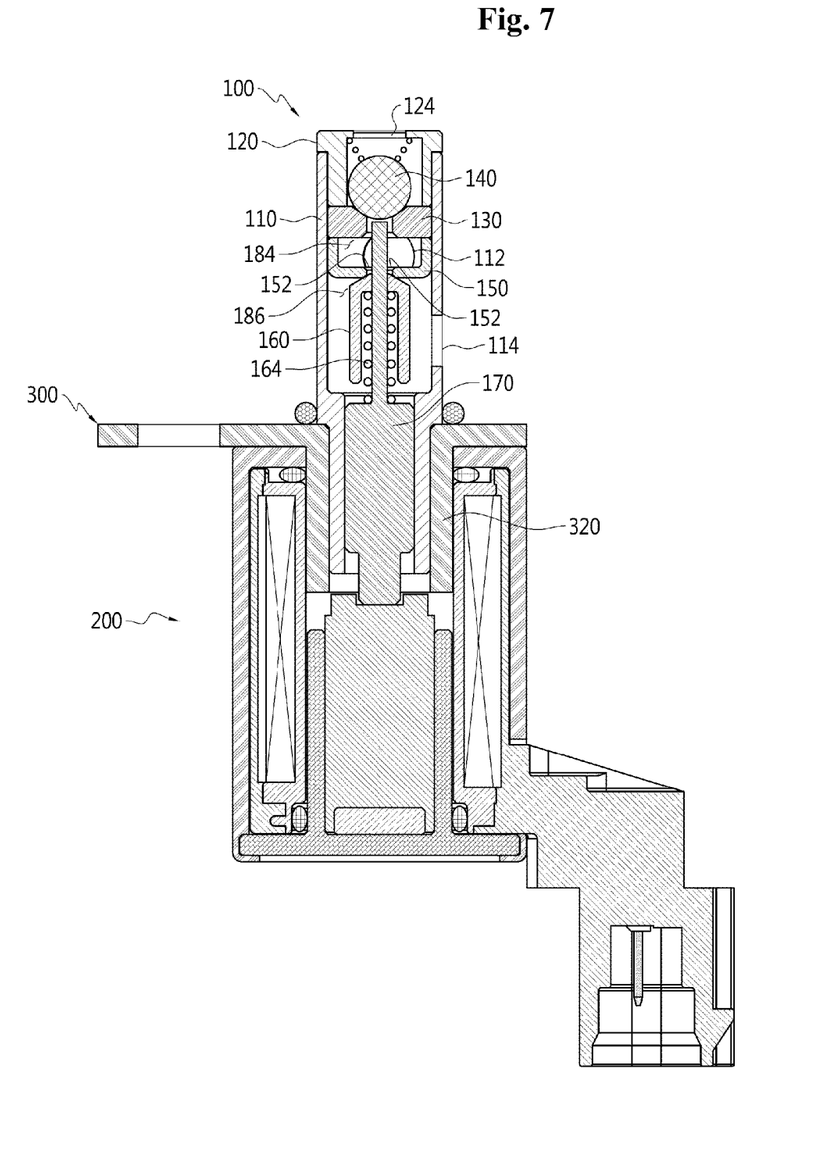
FIG. 7 illustrates an oil control valve according to a fourth embodiment of the present invention.

FIG. 7 illustrates an oil control valve according to a fourth embodiment of the present invention.

The oil control valve according to the fourth embodiment of the present invention includes a hydraulic part 100, an electronic part 200, and a bracket 300. Of these, the electronic part 200 and the bracket have the same structure as in the third embodiment.

With reference to FIG. 7, the hydraulic part 100 of the oil control valve comprises: a valve housing 110 having a control port 112 and a drain port 114; a valve cap 120 having an inflow port 124 and joined to an upper portion of the valve housing 110; and parts installed inside the valve housing 110, namely: an upper seat 130; a ball valve 140; a lower seat 150; a check valve 160; and a pilot 170.

Here, the lower seat 150, unlike in the first embodiment, is shaped like a cup placed right side up, and has the second through-hole 152 formed in the center of its lower portion. The lower seat 150 thus shaped, when installed in the oil control valve, has its upper circumference placed in close contact with the upper seat 130.

With the oil control valve according to the fourth embodiment constructed as described above, there is no worry about the lower seat 150 ascending due to the pushing of the pressing spring 164, and therefore, the second chamber 184 formed by the upper seat 130 and the lower seat 150 always has a constant volume. Consequently, the opening and closing of the second through-hole 152 by the check valve 160 is reliable, the emptying of the second chamber 184 through the third chamber 186 and the drain port 152 is reliable, and valve lift (not pictured) can be reliably controlled by the use of the oil control valve.

Figure 8:
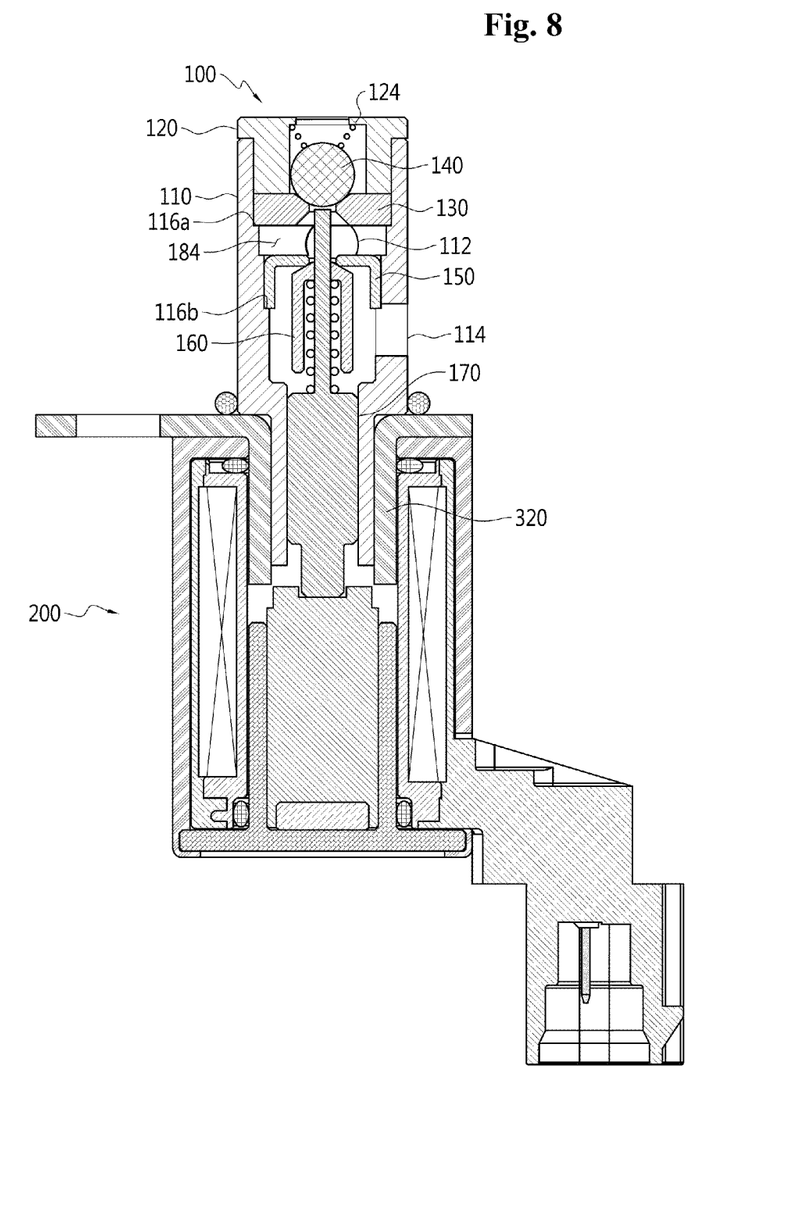
FIG. 8 illustrates an oil control valve according to a fifth embodiment of the present invention.

FIG. 8 illustrates an oil control valve according to a fifth embodiment of the present invention.

The oil control valve according to the fifth embodiment of the present invention includes a hydraulic part 100, an electronic part 200, and a bracket 300. Of these, the electronic part 200 and the bracket 300 have the same structure as in the fourth embodiment.

As illustrated in FIG. 8, the hydraulic part 100 of the oil control valve comprises: a valve housing 110 having a control port 112 and a drain port 114; a valve cap 120 having an inflow port 124 and joined to an upper portion of the valve housing 110; and parts installed inside the valve housing 110, namely: an upper seat 130; a ball valve 140; a lower seat 150; a check valve 160; and a pilot 170.

Of the aforementioned components, the valve housing 110 is formed as a vertically extended cylinder. The valve housing 110 is formed in multi-sections, so that the exterior of its lower portion can be inserted into the protrusion 320 of the bracket 300. Also, the interior of the valve housing 110 is formed in multi-sections, so that the upper seat 130 and the lower seat 150 may be placed securely.

To give a more detailed explanation about the valve housing 110, the interior of the valve housing 110 has a first ledge 116a, on which the upper seat 130 may be placed, and a second ledge 116b, on which the lower seat 150 may be placed.

If the upper and lower seats 130, 150 are affixed with the use of the first and second ledges 116a, 116b in this manner, the upper and lower seats 130, 150 can be prevented from moving from their positions due to vibrations occurring in the vehicle and shocks occurring during travel, and therefore, the second chamber 184 formed by the upper seat 130 and the lower seat 150 always has a constant volume. Consequently, the opening and closing of the second through-hole 152 by the check valve 160 is reliable, the emptying of the second chamber 184 through the third chamber 186 and the drain port 152 is reliable, and valve lift (not pictured) can be reliably controlled by the use of the oil control valve.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

The invention claimed is:

1. An oil control valve for a variable valve lift system, the oil control valve comprising:
   a valve housing
      having a cylindrical shape, and
      comprising
         a control port disposed in a middle portion of the valve housing, and
         a drain port disposed in a lower portion of the valve housing;
   a valve cap
      joined to an upper portion of the valve housing, and
      comprising an inflow port disposed in an upper surface of the valve cap;
   an upper seat
      disposed inside the valve housing,
      located above the control port, and
      comprising a first through-hole disposed in a center of the upper seat;
   a lower seat
      disposed inside the valve housing,
      located below the control port, and
      comprising a second through-hole disposed in a center of the lower seat;
   a ball valve
      configured to
         move up and down in a first chamber formed by the valve cap and the upper seat, and
         open and close the first through-hole;
   a check valve
      configured to move up and down below the lower seat, and
      comprising
         an upper portion protruding convexly so as to open and close the second through-hole, and
         a third through-hole disposed in a center of an upper surface of the check valve;
   a pilot
      configured to move up and down inside the valve housing,
      comprising multi-sections such that an upper portion of the pilot has a smaller diameter than that of a lower portion of the pilot, the upper portion of the pilot configured to contact the ball valve through the first to third through-holes;
   a pressing spring
      disposed on the upper portion of the pilot,
      configured to elastically push the check valve such that the upper portion of the check valve seals the second through-hole;
   a valve case in which the lower portion of the valve housing is inserted;
   a plunger
      disposed
         inside the valve case, and
         in close contact with the lower portion of the pilot;
   a bobbin
      encircling the plunger, and
      comprising a coil wound around a perimeter of the bobbin; and
   a yoke located between the plunger and the bobbin,
   wherein the check valve is configured to be elastically pushed upward by the pressing spring to seal the second through-hole to maintain residual pressure in a second chamber formed by the upper seat and the lower seat,
   wherein the upper seat has a greater diameter than that of the lower seat, and
   wherein an interior wall of the valve housing comprises a first ledge and a second ledge, the first ledge configured to receive the lower seat placed thereon, the second ledge configured to receive the upper seat placed thereon.

2. The oil control valve according to claim 1, further comprising:
   a return spring
      disposed between an interior upper surface of the valve cap and the ball valve, and
      configured to elastically push the ball valve such that the ball valve seals the first through-hole.

3. The oil control valve according to claim 2, wherein the lower seat has a cup shape, and an upper circumference of the lower seat is placed in close contact with a lower surface of the upper seat.

4. The oil control valve according to claim 3, wherein the upper seat, the lower seat, the ball valve, the check valve, and the pilot comprise a non-ferrous material lighter than iron.

5. The oil control valve according to claim 3, further comprising:
   a connector
      disposed on one side of the valve case,
      electrically connected with the bobbin, and
      configured to transmit power to the bobbin.

6. The oil control valve according to claim 3, further comprising:
   a mesh-type filter mounted on the inflow port of the valve cap.

7. The oil control valve according to claim 1, wherein the upper seat, the lower seat, the ball valve, the check valve and the pilot comprise a non-ferrous material lighter than iron.

8. The oil control valve according to claim 1, further comprising:
   a connector
      disposed on one side of the valve case,
      electrically connected with the bobbin, and
      configured to transmit power to the bobbin.

9. The oil control valve according to claim 1, further comprising:
   a mesh-type filter mounted on the inflow port of the valve cap.

* * * * *